United States Patent [19]

Sutton et al.

[11] Patent Number: 4,795,404
[45] Date of Patent: Jan. 3, 1989

[54] TRIPOD CONSTANT VELOCITY JOINT AND SEALING RETAINER THEREFOR

[75] Inventors: Noel W. Sutton, Northville; Glenn F. Gehrke, Brighton, both of Mich.

[73] Assignee: GKN Automotive Components Inc., Auburn Heights, Mich.

[21] Appl. No.: 894,283

[22] Filed: Aug. 7, 1986

Related U.S. Application Data

[63] Continuation-in-part of Ser. No. 589,994, Mar. 14, 1984, Pat. No. 4,605,384.

[51] Int. Cl.[4] .................................................. F16D 3/30
[52] U.S. Cl. ..................................... 464/111; 464/905
[58] Field of Search ............... 464/111, 123, 124, 146, 464/905, 906

[56] References Cited

U.S. PATENT DOCUMENTS

| | | | |
|---|---|---|---|
| 4,083,202 | 4/1978 | Westercamp | 464/111 X |
| 4,196,598 | 4/1980 | Hirai et al. | 464/111 |
| 4,280,340 | 7/1981 | Goguet | 464/111 X |
| 4,320,632 | 3/1982 | Dore | 464/111 |
| 4,379,706 | 4/1983 | Otsuka et al. | 464/111 |
| 4,605,384 | 8/1986 | Kurzeja et al. | 464/111 |

Primary Examiner—Daniel P. Stodola
Attorney, Agent, or Firm—Remy J. VanOphem

[57] ABSTRACT

A self-aligning tripod joint tulip cover for use in a tripod joint assembly that has an irregularly shaped, non-circular tulip body and a shaft mounted spider assembly, the tulip cover having a cylindrical flange that surrounds a portion of the tulip body, interconnecting projections extending from the cylindrical flange that are received in part annular recesses of part cylindrical outer surface portions of the tulip body to secure the tulip cover to the tulip body, the tulip body further having an annular flange that extends radially inwardly from the cylindrical flange to lie in close proximity to the front face of the tulip body and to trap a resilient, annular sealing member therebetween. The tulip body has a longitudinal recess therein and longitudinal tracks that extend radially outwardly from the recess, each such recess slidingly receiving a roller of the spider assembly to permit reciprocation of the spider assembly within the tulip body. The tulip cover also has longitudinally extending projections which extend from the annular flange into the tracks in the tulip body to help prevent relative rotational movement between the tulip cover and the tulip body. The tripod joint assembly also has an annular flexible sealing boot, one end of which is attached to the shaft of the spider assembly and the other end of which is attached to the outside of the cylindrical flange of the tulip cover and is maintained in such position by a constricting band. The tulip cover is molded in a single piece from a thermoplastic material.

10 Claims, 3 Drawing Sheets

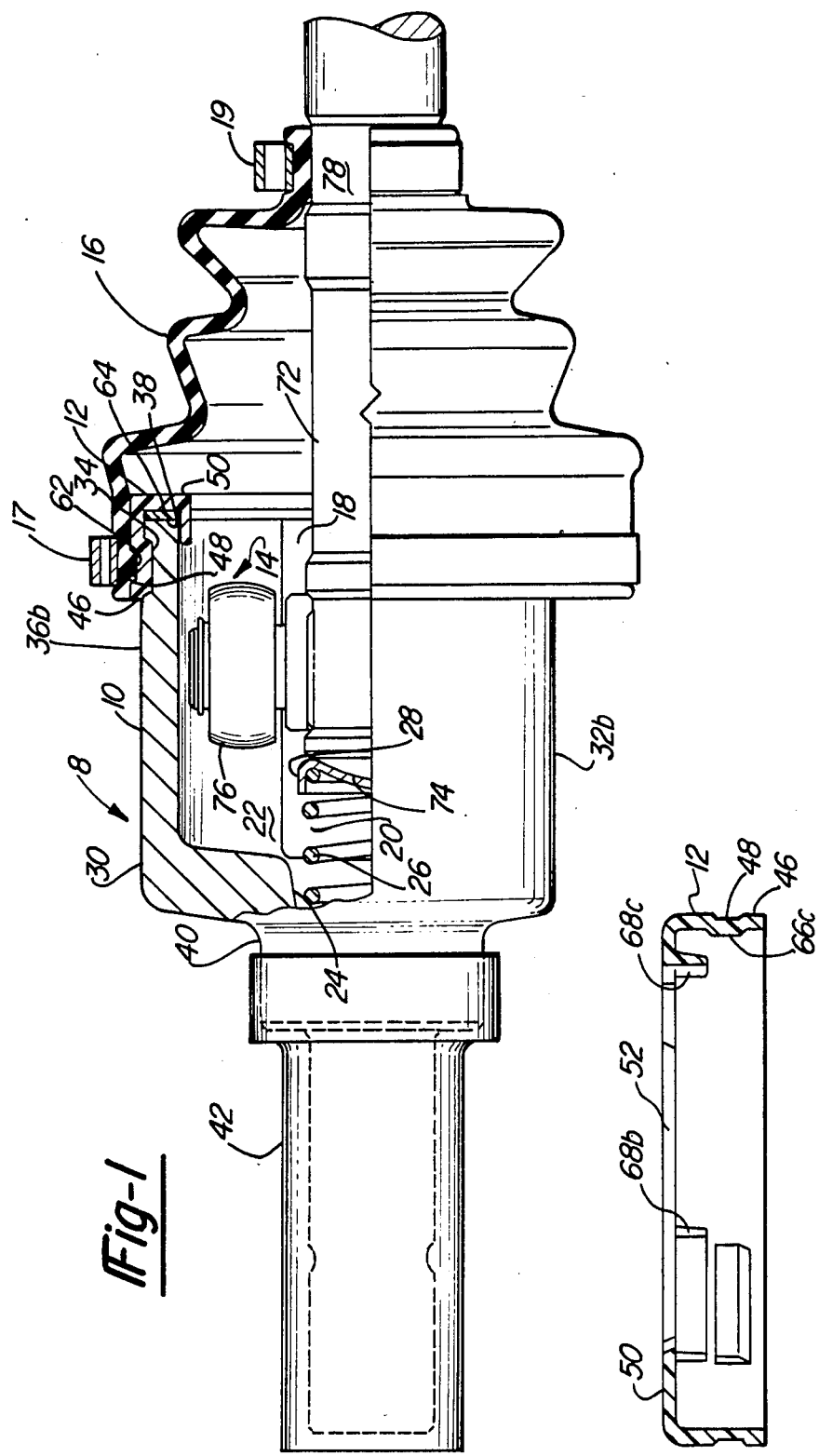

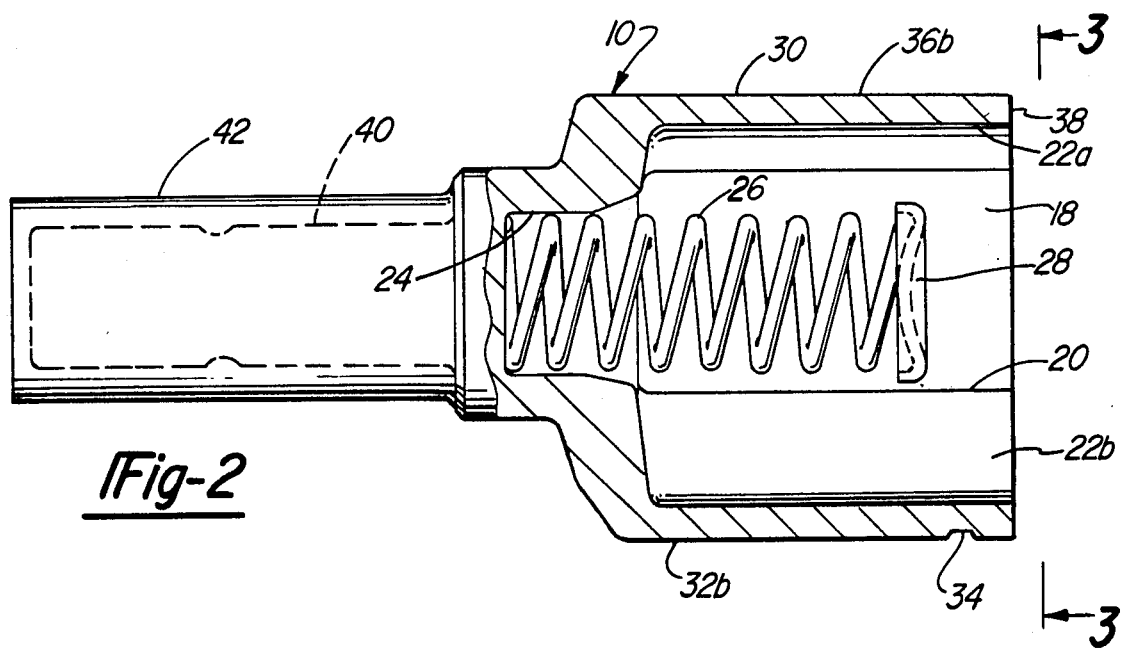
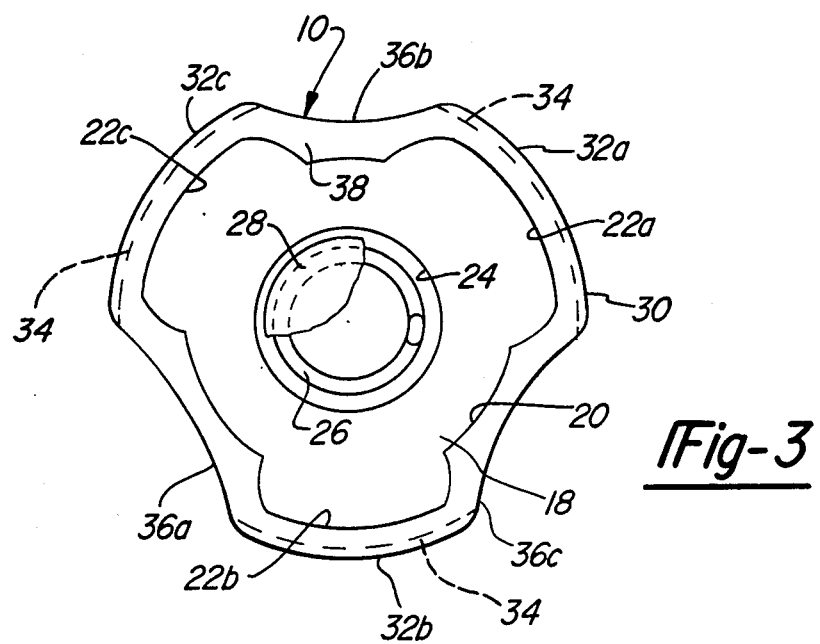

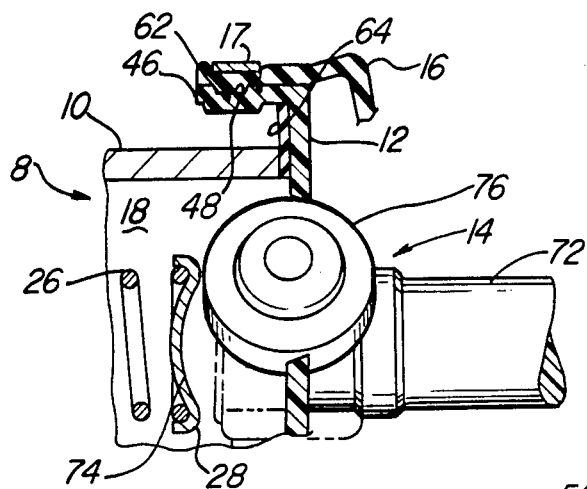
*Fig-7*
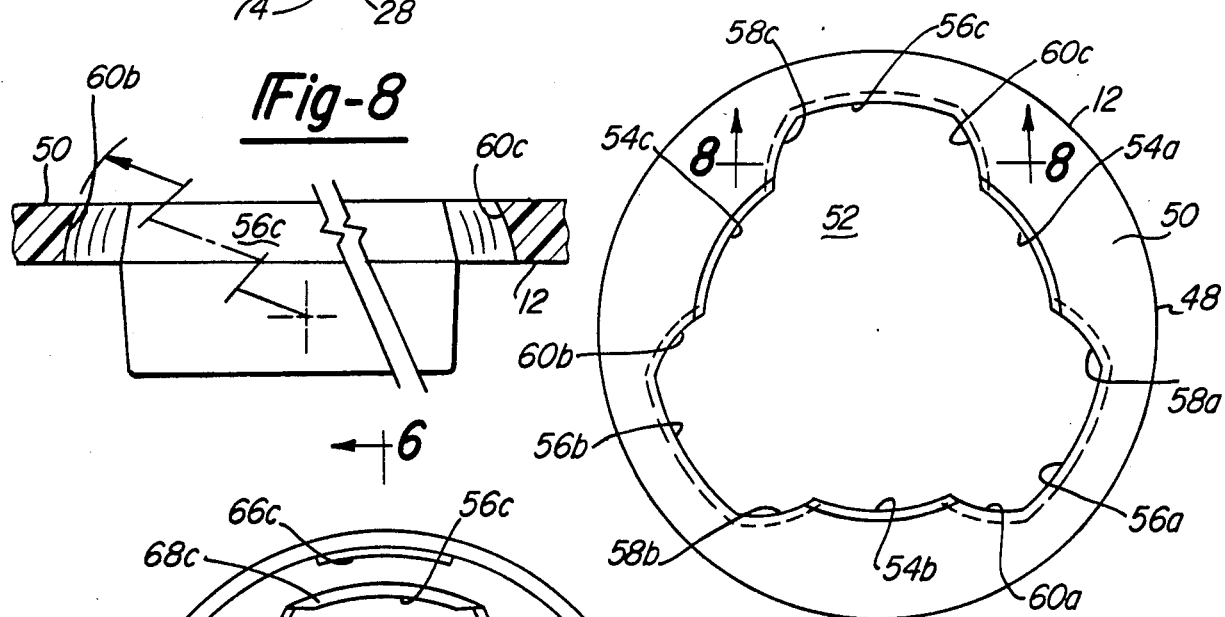
*Fig-8*
*Fig-4*
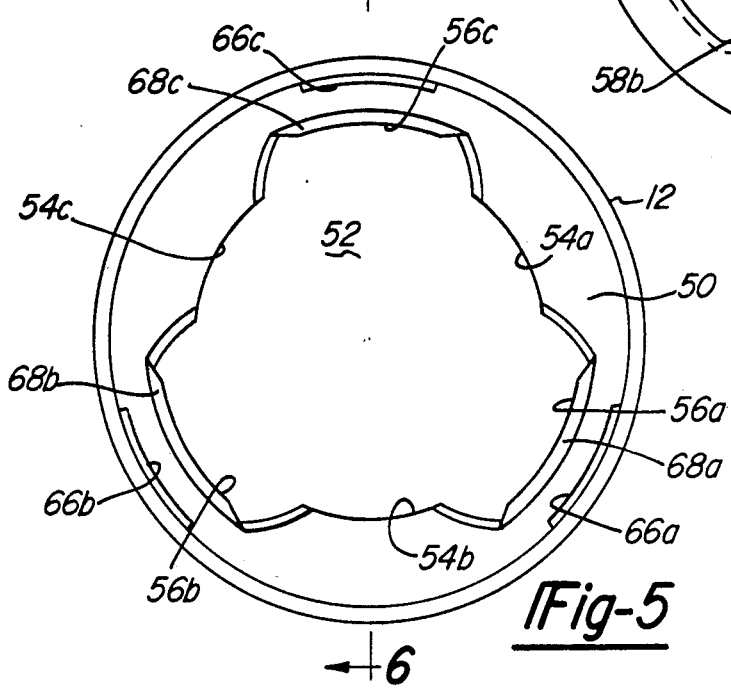
*Fig-5*

TRIPOD CONSTANT VELOCITY JOINT AND SEALING RETAINER THEREFOR

This application is a continuation-in-part of U.S. patent application Ser. No. 589,994 filed on Mar. 14, 1984, now U.S. Pat. No. 4,605,384 entitles "Self-aligning Tripod Joint Tulip Cover and Constant Velocity Joint" which issued Aug. 12, 1986.

BACKGROUND OF THE INVENTION

1. Field of the Invention

The present invention is directed to a self-aligning tulip cover for interconnecting and aligning a spider assembly, a tulip body, and a boot, as well as a closed tripod constant velocity joint assembly incorporating the self-aligning tripod joint tulip cover.

2. Description of the Prior Art

Closed tripod joints have been popular for use in half-shaft assemblies of front wheel drive motor vehicles. A tripod joint i commonly used because of its ability to transmit torque at a constant velocity, in addition to allowing the joint centerline to move in an axial direction. This joint centerline movement is primarily caused by the movement of the suspension system in jounce and rebound and the movement of the power train on its mounts.

In addition to transmitting torque and allowing joint centerline movement axially, the plunging joint characteristics of a tripod joint in a front wheel drive vehicle also enables the tripod joint to act as an isolator for vibrations. These vibrations are generated by the power train due to its inherent unbalance and have to be isolated from the suspension system in order to eliminate any noticeable disturbances to the vehicle occupants.

The cover of a closed tripod joint has, in the past, been used to retain the tripod assembly inside the tulip body during operation. Prior art designs exist where a convoluted cover is assembled to the tulip body in such a manner that the convolutes of the cover fit on the irregular contours of the tulip forging. This results in an expensive tripod joint as well as one which may be difficult to assemble. Furthermore, the sealing boot may have to be lobed in these prior art designs to conform to the irregular contour of the tulip body, increasing the expense of manufacturing the boot and assembling it to the closed tripod joint.

Another consideration in the design of closed tripod joints is that it is paramount for the proper lubrication and function of the closed tripod joint that an airtight seal exists between the sealing cover and the tripod body. Typically, this sealing has been achieved in the past by interconnection of one end of the boot to the outer surface of the tulip body or to the outer surface of a sealing cover mounted coaxially with the tulip body.

Several examples of prior art closed tripod joints, as well as tulip covers and boots therefor, may be found in Goguet, U.S. Pat. No. 4,280,340 issued July 28, 1981; Westercamp, U.S. Pat. No. 4,083,202 issued Apr. 11, 1978; Dore, U.S. Pat. No. 4,320,632 issued Mar. 23, 1982; Kobayashi, U.S. Pat. No. 4,224,806 issued Sept. 30, 1980; Hirai, et al., U.S. Pat. No. 4,196,598 issued Apr. 8, 1980; Ukai, et al., U.S. Pat. No. 4,360,209 issued Nov. 23, 1982; Sakaguchi, et al., U.S. Pat. No. 4,167,860 issued Sept. 18, 1979; and Goddard, et al., U.S. Pat. No. 1,987,678.

What is needed, therefore, is an inexpensive tripod joint tulip cover which is self-aligning and provides a good seal with the tulip body. Furthermore, what is needed is such a tripod joint tulip cover which is easily interconnected with a boot having a regular circular contour. Additionally, what is needed is a tripod joint tulip cover that is inherently resistant to rotating on the tripod body after application thereto and that a cover can be readily removed from the tripod body to permit the servicing of the tripod joint. Also, what is needed is a tripod joint tulip cover that can be assembled to the tripod joint without requiring any post-assembly crimping or other reforming operations to ensure its proper retention on the tripod joint.

SUMMARY OF THE PRESENT INVENTION

The present invention provides a self-aligning tripod joint tulip cover for interconnecting an irregularly shaped, non-circular tulip body, a shaft mounted spider assembly, and a boot, as well as the closed tripod constant velocity joint incorporating the self-aligning tripod joint tulip cover, the tulip body, the shaft mounted spider assembly, and the boot.

The tulip cover of the present invention is a one-piece, molded plastic member which has a cylindrical flange that closely fits over the outer surface of the tulip body with radially inwardly projecting flanges that are received in partial annular recesses in the lobes, or concave surface portions of the tulip body, to provide a snap fit between the tulip cover and the tulip body. The tulip cover also has an inwardly extending annular radial flange that traps a flat resilient seal between such radial flange and the end surface of the tulip body to provide for a suitable seal between the tulip body and the tulip cover, notwithstanding that the outer surface of the tulip body is irregular, or non-cylindrical, while the portion of the tulip cover which overlaps such tulip body outer configuration is cylindrical in configuration.

The tulip cover of the present invention also has longitudinally extending projections which are aligned with and project into the roller tracks in the tulip body to prevent relative circumferential movement between the tulip body and the tulip cover after the assembly of the tulip body and the tulip cover to one another. Further, the annulus of the annular, radial flange of the tulip cover is provided with circumferentially spaced apart cutaway portions, each of which corresponds in shape to and is aligned with one of the roller tracks in the tulip body, each such cutaway portion having a configuration that permits it to engage the roller of the spider assembly that rides in such track in a substantially continuous lineal pattern to prevent the inadvertent disengagement of the spider assembly from the tulip cover during the operation of the tripod joint assembly.

Accordingly, it is an object of the present invention to provide a new and improved tulip cover for a tripod constant velocity joint assembly, and it is a corollary object to provide a tripod constant velocity joint that incorporates such a tulip cover. More particularly, it is an object of the present invention to provide a one-piece, molded plastic, self-centering, rotation resistant tulip cover for a tripod constant velocity joint assembly, and it is a corollary object to provide a tripod constant velocity joint assembly that incorporates such a one-piece, molded plastic self-centering, rotation-resistant tulip cover.

It is also an object of the present invention to provide a tulip cover for the tulip body of a tripod constant velocity joint assembly that may be readily removed from the joint assembly for the servicing of the joint assembly, and it is a corollary object to provide a tripod constant velocity joint assembly that has a tulip cover which may be readily removed from the joint assembly for the servicing of the joint assembly.

For a further understanding of the present invention and the objects thereof, attention is directed to the drawing and the following brief description thereof, to the detailed description of the preferred embodiment and to the appended claims.

BRIEF DESCRIPTION OF THE DRAWINGS

FIG. 1 is a side elevational view, partly in section, of the preferred embodiment of a closed tripod constant velocity joint assembly of the present invention;

FIG. 2 is a side elevational view, partly in section, of the tulip body component of the constant velocity joint assembly shown in FIG. 1;

FIG. 3 is view taken on line 3—3 of FIG. 2;

FIG. 4 is a front elevational view of the sealing retainer that is shown in the constant velocity joint assembly in FIG. 1;

FIG. 5 is a rear elevational view of the sealing retainer that is shown in FIG. 4;

FIG. 6 is a sectional view taken on line 6—6 of FIG. 5;

FIG. 7 is a fragmentary sectional view of the tripod constant velocity joint assembly of FIG. 1 showing the elements of the assembly in a somewhat different orientation and position; and FIG. 8 is a fragmentary sectional view, at an enlarged scale, taken on line 8—8 of FIG. 4 and showing a portion of the sealing retainer of FIGS. 1 and 4 through 8.

DETAILED DESCRIPTION OF THE PREFERRED EMBODIMENT

Referring now to FIG. 1, there is shown a tripod constant velocity joint assembly, indicated generally by reference numeral 8, which includes a tulip body 10. As is known in the prior art, and as is shown in FIGS. 2 and 3, the tulip body is an elongated forging which has a longitudinal cavity 18 formed at one end. The longitudinal cavity 18, as best shown in FIGS. 2 and 3, has a cylindrical bore 20 surrounded by three tracks 22a, 22b, and 22c, each extending radially outwardly from the cylindrical bore 20 and extending generally in a longitudinal direction, relative to the tulip body 10. The longitudinal cavity 18 is further provided with a reduced diameter bore 24 coaxial with the cylindrical bore 20. A coil spring 26 extends coaxially from the reduced diameter bore 24 into the cylindrical bore 20. A spring cup 28 is mounted on the free end of the coil spring 26.

The tulip body 10 is further provided with an irregularly shaped outer surface 30. The outer surface 30 has three partial circular cylindrical surface portions 32a, 32b, and 32c, equally spaced about the outer surface, each of the partial circular cylindrical surface portions being concentric with the cylindrical bore 20 and aligned with a respective one of the three tracks 22a, 22b, and 22c. Each of the partial circular cylindrical surface portions 32a, 32b, and 32c is provided with a partial annular recess 34.

The outer surface 30 is further provided with three concave surface portions 36a, 36b, and 36c, alternatingly disposed between adjacent pairs of the partial circular cylindrical surface portions 32a, 32b, and 32c. A flat irregularly shaped annular surface 38 is formed between the outer surface 30 of the tulip body 10 and the longitudinal cavity 18 thereof. The tulip body 10 is also provided, as best shown in FIG. 2, with a shaft portion 40 extending coaxially with the cylindrical bore 20 in a direction opposite the cylindrical bore. A protector 42 is removably mounted on the shaft portion 40 of the tulip body 10 to protect the shaft portion 40 from damage during the handling and assembly of the tulip body 10.

Referring now to FIG. 1, the tripod constant velocity joint assembly 8 of the present invention is provided with a tulip cover 12 which is secured to the tulip body 10 adjacent the open end thereof, in a manner to be hereinafter described, a spider assembly 14, and a sealing boot 16, one end of which is sealingly secured to the tulip cover 12 by a constricting band 17, the other end of which is secured to a reduced diameter portion 78 of a shaft 72 of the spider assembly 14 by a constricting band 19. As shown, the sealing boot 16 is pleated in configuration to provide it with the needed flexibility to accommodate the joint centerline movement that is required of the joint assembly 8. Preferably, for the same reason, it is formed out of a material that has good flexibility, such as an elastomeric material.

The tulip cover 12 is provided with a cylindrical flange 46 which surrounds the open end of the tulip body 10 when the tulip cover 12 is attached thereto, as is shown in FIG. 1, and the cylindrical flange 46 is provided with an annular recess 48 therein to receive an inwardly projecting annular rib 62 of the sealing boot 16 to facilitate the attachment of the sealing boot 16 to the tulip cover 12. The tulip cover 12 also has a radially extending flange 50 which extends radially inwardly from an end of the cylindrical flange 46. The radially extending flange 50 defines a central aperture 52 of irregular configuration, and the central aperture 52, as is shown in FIGS. 4 through 6, includes part circular portions 54a, 54b, and 54c which are separated, respectively, by lobe-shaped cutaway portions 56a, 56b, and 56c. The part circular portions 54a, 54b, and 54c of the central aperture each are of approximately the same diameter as the cylindrical bore 20 in the tulip body 10, and when the tulip cover 12 is properly attached to the tulip body 10, as shown in FIG. 1, the part circular portions 54a, 54b, and 54c will be in alignment with the portions of the cylindrical bore 20 that lie between the tracks 22a, 22b, and 22c therein. The cutaway portions 56a, 56b, and 56c of the central aperture 52 each have a cross-sectional shape that generally corresponds to the cross-sectional shape of the tracks 22a, 22b, and 22c respectively, and will be in alignment with the tracks 22a, 22b, and 22c when the tulip cover 12 is attached to the tulip body 10 as shown in FIG. 1. The cutaway portion 56a is provided with contoured portions 58a and 60a on opposed sides thereof. The contoured portions 58a and 60a are provided to engage a roller of the spider assembly 14, in a manner to be described hereinafter. Similar contoured portions 58b and 60b and 58c and 60c, respectively, are provided on opposed sides of the cutaway portions 56b and 56c to engage other rollers of the spider assembly.

The constant velocity joint assembly 8 also includes a flat, annular, resilient seal member 64, such as a nitrile gasket, to form a seal between the tulip body 10 and the tulip cover 12 to help retain grease within the tulip body and keep dust, dirt and moisture from the driving environment out of the tulip body. The seal member 64 has a shape that generally corresponds to that of the radially extending flange 50 of the tulip cover 12 and, in the assembled constant velocity joint assembly 8, as shown in FIG. 1, the seal member 64 is sealingly compressed between the inside of the radially extending flange 50 of the tulip cover 12 and the outside, flat radially extending face of the tulip body 10.

To facilitate the attachment of the tulip cover 12 to the tulip body 10, the radially innermost surface of the cylindrical flange 46 of the tulip cover 12 is provided with spaced apart, inwardly radial extending arcuate projections 66a, 66b, and 66c, each of which, respectively, is received in the partial annular recess 34 of the surface portions 32a, 32b, and 32c of the tulip cover to form a snap fit between the tulip cover 12 and the tulip body 10. By carefully controlling the longitudinal spacing between each of the partial annular recesses 34 and the outside, radially extending face of the tulip body, and between the inside of the radially extending flange 50 of the tulip cover 12 and the radially extending arcuate projections 66a, 66b, and 66c, and by carefully controlling the thickness of the seal member 64, it is possible to obtain a very accurately established sealing pressure in the seal member 64 for optimum seal performance between the tulip body 10 and the tulip cover 12.

The inside of the radially extending flange 50 of the tulip cover 12 is also provided with longitudinally extending projections 68a, 68b and 68c that serve to define, respectively, the radially outermost limits of the cutaway portions 56a, 56b, and 56c. The longitudinally extending projections 68a, 68b, and 68c extend, respectively, into the tracks 22a, 22b, and 22c of the tulip body 10 when the tulip cover 12 is properly applied thereto, as shown in FIG. 1, and the resulting interengagement between the longitudinally extending projections 68a, 68b, and 68c and the tracks 22a, 22b, and 22c, as described, helps to center the tulip cover 12 on the tulip body 10 and to prevent circumferential dislocation of the tulip cover 12 and the tulip body 10 with respect to one another in spite of the various types of relative torque that may be applied thereto during the normal operation of the constant velocity joint assembly.

The tulip cover 12, as heretofore described, is preferably formed in a single piece, a result which can be achieved by forming the tulip cover 12 from a suitable thermoplastic material, for example, by an injection molding process that can be quite conventional. Various injection molding grades of Nylon (a polyamide resin), including a glass particle-filled grade thereof, have suitable strength, temperature and grease resistance for the intended application and sufficient resistance to "creep" (gradual elongation under load) to be able to withstand the kinds of loads that are likely to be encountered in such application without any change in any critical dimension that would detract from its satisfactory performance. Further, such materials, when injection molded, can be provided with very closely controlled dimensions, for example, the spacing between the inside of the radially extending flange and the radially extending arcuate projections 66a, 66b, and 66c, a dimension that serves to establish the sealing pressure in the seal member, as heretofore explained. Additionally, when the tulip cover 12 is formed by injection molding from such a thermoplastic material, it will have sufficient elasticity to permit the cylindrical flange 46 to be stretched to allow it to be inserted over the open end of the tulip body 10, at the same time maintaining a normal interference fit between the inside of the arcuate projections 66a, 66b, and 66c and the outer surface 30 of the tulip cover 12 to ensure a good snap fit between the inside of the arcuate projections 66a, 66b, and 66c in the partial annular recesses 34 of the part cylindrical surface portions 32a, 32b, and 32c, respectively. Of course, the reinforcement of the cylindrical flange 46 by the constricting band 17, after the tulip cover 12 has been applied to the tulip body 10, helps to ensure that the cylindrical flange 46 will not be inadvertently disengaged from the tulip body 10 during the operation of the constant velocity joint assembly 8.

The spider assembly 14 of the constant velocity joint assembly 8 has a partial spherical portion 74 on the end of the shaft 72, the partial spherical portion 74 bearing against a spring cup 28 to compress the spring and to thereby provide the joint assembly 8 with the required axial joint centerline movement. Further, the spider assembly 14 is provided with three circumferentially spaced apart rollers, one of which is rollingly received in each of the tracks 22a, 22b, and 22c of the tulip body 10. Only one of such rollers, roller 76, is illustrated. As is shown in the drawing in connection with the roller 76 and the cutaway portion 56c of the central aperture 52 of the tulip cover 12 that is aligned with the track 22c in which the roller 76 is rollingly engaged, the configuration of such cutaway portion 56c, including the contoured portions 58c and 60c thereof, is such that the roller 76 will make substantially continuous lineal contact with such cutaway portion 56c when the spider assembly 14 is adjacent the open end of the tulip body 10, and the cutaway portion 56c will then limit further travel of the roller 76 of the spider assembly 14, and thereby help to limit further travel of the spider assembly 14 itself, toward the open end of the tulip body 10 to prevent the inadvertent withdrawal of the spider assembly 14 from the tulip body 10. Otherwise, the spider assembly 14 and its operation within the constant velocity joint assembly 8 are well known in the art and will not be further described or illustrated herein.

Thus, a one-piece thermoplastic tulip cover 12, as heretofore described, is self-centering with respect to the tulip body 10 upon application thereto, without the need for any subsequent manufacturing, assembling or reforming operation to ensure such self-centering characteristics and, therefore, is inherently resistant to rotation on the tulip body 10 during service, it is relatively easy to remove from the tulip cover 12 for service of the joint assembly, requiring only the removal of the constricting band to facilitate the removal of the tulip cover 12 and thereby permitting, at least in some cases, the reuse of the tulip cover 12 in the serviced joint assembly, and it inherently acts as a retainer to retain the spider assembly 14 in the joint assembly 8 to prevent the inadvertent disengagement of the spider assembly from the joint assembly 8. Additionally, a molded plastic tulip cover, such as the tulip cover 12, can be both manufactured at less cost and installed at less cost than a fabricated metal tulip cover, such as that disclosed in the aforesaid co-pending application Ser. No. 589,994, now U.S. Pat. No. 4,605,384 and will help to reduce the weight of the joint assembly that utilizes such a molded plastic tulip cover.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A self-aligning tulip cover for interconnecting and aligning a spider assembly, an irregularly shaped non-circular tulip body, and a boot; said irregularly shaped non-circular tulip body having an open cavity therein, an irregularly shaped non-circular outer circumferential surface disposed about said open cavity, and a first surface extending between said irregularly shaped non-circular outer circumferential surface and said open cavity; said spider assembly having a portion selectively insertable in said open cavity; said boot further having an inner surface with a cylindrical end portion; said self-aligning tulip cover further comprising:
   a cylindrical flange portion selectively engageable with said irregularly shaped non-circular outer circumferential surface of said irregularly shaped non-circular tulip body, said cylindrical flange portion further being adapted to sealingly engage said cylindrical end portion of said boot;
   a radial flange portion, said radial flange portion extending radially inwardly from said cylindrical flange portion and being formed integrally therewith, said radial flange portion further being juxtaposed said flat surface of said irregularly shaped non-circular tulip body, said radial flange portion further having longitudinally extending projection means for selectively engaging said spider assembly, such as to retain said spider assembly in a preselected aligned orientation in said open cavity when said cylindrical flange portion is interconnected with said irregularly shaped non-circular outer circumferential surface of said irregularly shaped non-circular tulip body;
   a seal member sealingly mounted between said radial flange portion of said self-aligning tulip cover and said flat surface of said irregularly shaped non-circular tulip body;
   interconnection means formed integrally with said cylindrical flange portion for selectively interconnecting said cylindrical flange portion with said irregularly shaped non-circular outer circumferential surface of said irregularly shaped non-circular tulip body, such that said radial flange portion engages said seal member to provide a seal with said flat surface extending between said irregularly shaped non-circular outer circumferential surface and said open cavity when said cylindrical flange portion is interconnected with said irregularly shaped non-circular outer circumferential surface of said irregularly shaped non-circular tulip body;
   said tulip body further having a plurality of circumferentially spaced apart longitudinal tracks extending radially outwardly from said open cavity; and
   said longitudinally extending projection means further having a plurality of circumferentially spaced apart longitudinally extending projections extending from and integrally formed with said radial flange portion, each one of said plurality of circumferentially spaced apart projections extending into a respective one of each of said plurality of circumferentially spaced apart longitudinal tracks in said tulip cover to prevent relative circumferential movement between said tulip cover and said tulip body.

2. A self-aligning tulip cover according to claim 1 wherein said irregularly shaped non-circular outer circumferential surface has a first annular recess and wherein said interconnection means comprises a plurality of radially inwardly extending arcuate projections located on said cylindrical flange portion and further mounted in said first annular recess; a second annular recess adjacent said radially extending arcuate projections, said second annular recess being adapted to receive an annular rib located on said inner surface of said cylindrical end portion or said boot to facilitate the application of said boot to said cylindrical flange portion.

3. A self-aligning tulip cover according to claim 2 wherein said tulip cover is formed in one piece from a thermoplastic material.

4. A self-aligning tulip cover according to claim 1 wherein said tulip cover is formed in one piece from a thermoplastic material.

5. A constant velocity joint assembly comprising:
   an irregularly shaped non-circular tulip body;
   an open cavity formed in said irregularly shaped non-circular tulip body, said open cavity having a longitudinal central axis;
   an irregularly shaped non-circular outer circumferential surface for said irregularly shaped non-circular tulip body disposed concentric with said open cavity;
   a flat surface formed on said irregularly shaped non-circular tulip body between said irregularly shaped non-circular outer circumferential surface and said open cavity;
   a spider device having a first portion selectively insertable in said open cavity and a second portion remote from said first portion, said spider device being movable within said open cavity along said longitudinal central axis;
   a boot having an annular radially inwardly extending rib;
   an inner surface formed in said boot, said inner surface having a first end selectively interconnectable with said second portion of said spider device and a second end disposed adjacent said irregularly shaped non-circular outer circumferential surface of said tulip body; and
   a tulip cover selectively mountable to said irregularly shaped non-circular outer circumferential surface adjacent said first portion of said spider device, said tulip cover comprising:
      a cylindrical flange portion selectively engageable with said irregularly shaped non-circular outer circumferential surface of said tulip body, said cylindrical flange portion having an inner surface and an outer surface, said outer surface having an annular recess therein, said annular radially inwardly extending rib of said boot being received in said annular recess;
      a radial flange portion extending radially inwardly from said cylindrical flange portion and formed integrally therewith, said radial flange portion being juxtaposed said flat surface of said irregularly shaped non-circular tulip body;
      a seal member sealingly mounted between said radial flange portion of said tulip cover and said flat surface of said irregularly shaped non-circular tulip body; and
      interconnection means formed integrally with said cylindrical flange portion for selectively interconnecting said cylindrical flange portion with said irregularly shaped non-circular outer circumferential surface of said irregularly shaped non-circular tulip body such that said radial flange portion engages said seal member to provide a seal with said flat surface.

6. A constant velocity joint assembly according to claim 5 and further comprising:
   a constricting band sealingly mounted concentric with said second end of said boot, said constricting band surrounding said second end of said boot and compressing said second end of said boot against said cylindrical flange portion in a circumferential pattern.

7. A constant velocity universal joint assembly according to claim 6 wherein said constricting band is radially aligned with said annular radially inwardly extending rib of said second end of said boot to of said second end of said boot in said annular recess of said outer surface of said cylindrical flange portion of said tulip cover.

8. A constant velocity universal joint assembly according to claim 5 wherein said tulip body has a plurality of circumferentially spaced apart longitudinal tracks extending radially outwardly from said open cavity and wherein said self-aligning tulip cover further comprises:
   a plurality of circumferentially spaced apart projections extending longitudinally from said radial flange portion and formed integrally with said radial flange portion, one of said plurality of circumferentially spaced apart projections extending into each of said longitudinal tracks in said tulip cover to help prevent relative circumferential movement between said tulip cover and said tulip body.

9. A constant velocity universal joint assembly according to claim 8 wherein said tulip body comprises a circumferentially spaced apart plurality of partial cylindrical surface portions and a circumferentially spaced apart plurality of concave surface portions, each of said plurality of concave surface portions being disposed between adjacent partial cylindrical surface portions, wherein each of said partial cylindrical surface portions has a partial annular recess therein, and wherein said interconnection means of said tulip cover further comprises projection means on said inner surface of said cylindrical flange portion that is received in said partial annular recess of each of said partial cylindrical surface portions of said tulip body to from a snap fit between said tulip cover and said tulip body.

10. A constant velocity joint according to claim 9 wherein said radial flange portion has a plurality of circumferentially spaced apart, irregularly shaped cutaway portions, said cutaway portions being aligned, respectively, with said circumferentially spaced apart tracks of said tulip body, and wherein said spider device comprises a plurality of circumferentially spaced apart rollers, said rollers, respectively, being rollingly engaged in said tracks of said tulip body, said plurality of cutaway portions being adapted to engage said plurality of rollers to prevent the withdrawal of said spider device from said open cavity of said tulip body.

* * * * *

UNITED STATES PATENT AND TRADEMARK OFFICE
CERTIFICATE OF CORRECTION

PATENT NO. : 4,795,404
DATED : January 3, 1989
INVENTOR(S) : Sutton et al

It is certified that error appears in the above-identified patent and that said Letters Patent is hereby corrected as shown below:

Column 1, line 7, delete "entitles" and insert ---- entitled ----.

Column 1, line 21, delete "i" and insert ---- is ----.

Column 4, line 48, after "22c" insert a comma ---- , ----.

In the Claims

Column 7, line 6, delete "first" and insert ---- flat ----.

Column 9, line 14, after "to" insert ---- help to keep said annular rib ----.

Signed and Sealed this

Thirtieth Day of May, 1989

Attest:

DONALD J. QUIGG

Attesting Officer

Commissioner of Patents and Trademarks